D. Tanquary,
Stump Elevator.
Nº 34,794.   Patented Mar. 25, 1862.
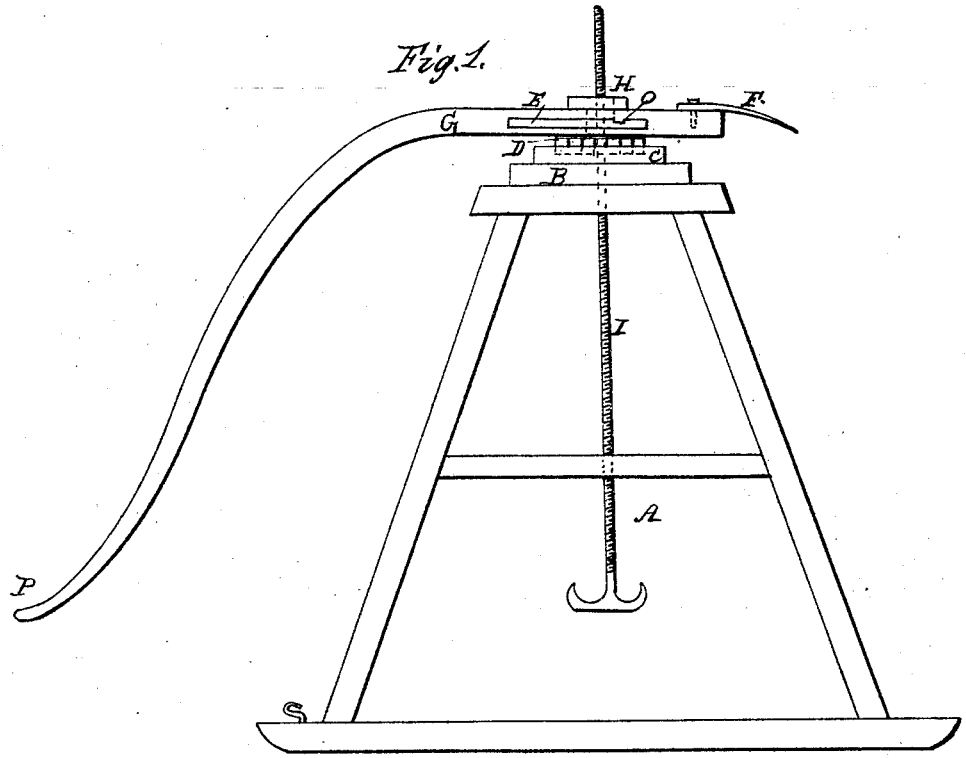
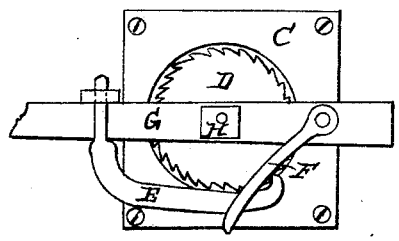
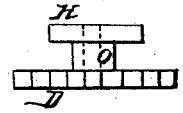
Witnesses
W. E. Marrs
H. H. Talcott
Inventor
Danl Tanquary

UNITED STATES PATENT OFFICE.

DAVID TANQUARY, OF CARMI, ILLINOIS.

IMPROVEMENT IN STUMP-EXTRACTORS.

Specification forming part of Letters Patent No. 34,794, dated March 25, 1862.

*To all whom it may concern:*

Be it known that I, DAVID TANQUARY, of Carmi, in White county, and State of Illinois, have invented a new and useful Improvement in Stump-Extractors; and I hereby declare that the following is a full and accurate description of the same, reference being had to the accompanying drawings, and the letters marked thereon, which form a part of this specification.

The nature of my invention consists in having a stump-extractor so constructed that, being drawn or placed directly over the stump by means of a lever or sweep connected with a nut which turns up a screw to which the stump is attached, the stump is readily extracted.

Figure 1 in the accompanying drawings is a side elevation of my machine; Fig. 2, a plan view above the plate C; and Fig. 3 shows the configuration of the nut, by the turning of which upon the rod I the stump is extracted.

To enable those skilled in the art to construct and use my stump-extractor, I will now proceed to describe its construction and operation with particularity.

A in the drawings is the frame of the machine, constructed of strong timbers of suitable size.

B is a platform of solid heavy planking fastened to the frame, and C is an iron plate bolted firmly to the frame through B. On the top of this iron plate is a sunken circular bed, on which that part of the nut marked D turns.

The nut (seen separately in Fig. 3 and in plan view in Fig. 2) is constructed as follows: The part marked D is in form of a ratchet-wheel, whose axis is prolonged, passing up through the sweep G. About the top of this prolonged axis is fixed the shoulder H, holding G in place. Through the entire length of this nut a female screw is cut, through and fitting into which the rod I passes, as seen in Fig. 1.

E is a ratchet-hook, which, in connection with D, is the means by which the power is applied to the nut, Fig. 3, G moving freely about the prolonged axis O.

To use my extractor, the stump is attached to I by swiveled chains. The spring F is brought around upon E, holding it upon D. The power is then applied at P, and by the action of the nut upon I the stump is extracted. By applying the power by means of the auxiliary lever E, when the stump is so situated that a continuous rotary motion cannot be given to G, it may be moved as far as possible and then turned back, moving freely about O, and E sliding on the teeth of D without depressing the rod I. This is repeated until the work is accomplished.

I claim as my invention and desire to secure by Letters Patent—

The application, combination, and arrangement of the sweep G, the hook E, the spring F, the nut, as seen in Fig. 3, and the rod I, constructed as described, and operating as and for the purposes, substantially as set forth.

DAVID TANQUARY.

Witnesses:
RICHARD D. MYERS,
WILLIAM S. PROCTOR.